(No Model.)
C. L. BROADBENT.
VALVE FOR PUMPS.
No. 307,172. Patented Oct. 28, 1884.
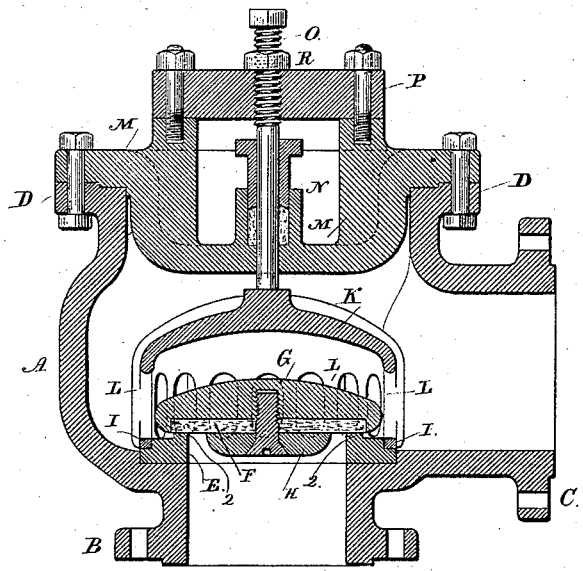
Fig. 1.
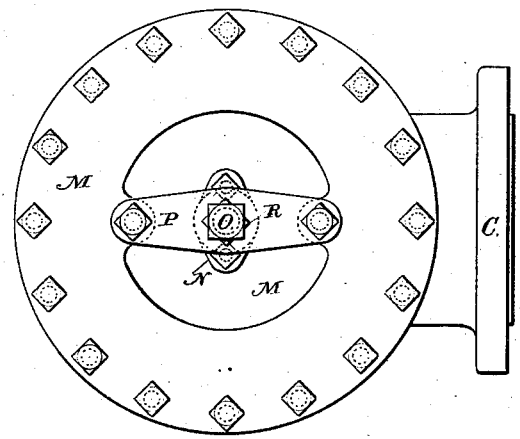
Fig. 2.
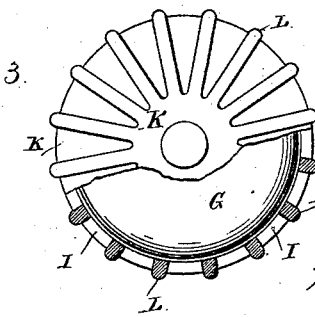
Fig. 3.
Witnesses
Chas. H. Smith
Harold Serrell
Inventor
Charles L. Broadbent

UNITED STATES PATENT OFFICE.

CHARLES L. BROADBENT, OF NEW YORK, N. Y., ASSIGNOR TO THE GEORGE F. BLAKE MANUFACTURING COMPANY, OF BOSTON, MASSACHUSETTS.

VALVE FOR PUMPS.

SPECIFICATION forming part of Letters Patent No. 307,172, dated October 28, 1884.

Application filed February 1, 1884. (No model.)

*To all whom it may concern:*

Be it known that I, CHARLES L. BROADBENT, of the city and State of New York, have invented an Improvement in Valves for Pumps, of which the following is a specification.

This valve is especially adapted to pumps that are employed for mining purposes where there are mineral substances that rapidly eat away and destroy valve-stems, bridges, or other small parts that are usually found within the water-way; but these improvements are available with any character of pump. I provide a valve-seat which is movable, and a cage that holds the valve, and a screw acting upon the cage to hold the same and the valve-seat to its place within the water-way, and there is a removable cover above the valve, so that the cage, the valve, and the valve-seat can be removed with facility whenever repairs are needed or when any part has to be replaced.

In the drawings, Figure 1 is a vertical section of the water-way and the parts of the valve and seat. Fig. 2 is a plan of the same; and Fig. 3 is a plan, partially in section, of the cage, valve-seat, and valve.

The body or case A of the valve is spheroidal in its general shape, with three openings and flanges, B C D. This valve is adapted to use at either the suction or at the eduction openings of the pump. When this valve-case is used at the suction, the suction-pipe is bolted or screwed to the inlet-flange B, and the outlet-flange C is bolted to the side of the pump. When the valve-case is used at the eduction, the flange B will be bolted to the pump and the flange C to the discharge water-pipe. The valve-seat E is received in a recess around the inlet-opening. It has a raised bearing, 2, for the valve to rest upon, and said valve is made with the india-rubber or leather disk F in the recessed under surface of the valve G, and H is a follower clamped by a screw or bolt to hold the rubber in place. Around the outer edge of the valve-seat is an annular recess, into which is received the base-ring I of the valve-cage, such cage having vertical guide-bars L around the valve, and a crown-piece, K, all formed in one, and preferably of brass or composition. The opening within the flange D is large enough for the valve-seat and the cage to be inserted or withdrawn, and the cap M is provided and bolted to this flange D. There is a central opening and packing-gland, N, for the screw O, and a movable bridge-bar, P, through which the screw O passes, and it can be screwed down to press upon the crown of the valve-cage and hold the same and the valve-seat securely to place. The packing-gland N makes the parts air-tight and prevents the water reaching and injuring the screw portion of the bolt O, and the set-nut R may be used to prevent the screw O working loose. The gland and bridge may be dispensed with in cases where the screw O is screwed into the cap itself. The cage L, with the holes, may be separate from the cup portion K, if desired.

I claim as my invention—

1. The combination, with the valve-case having the openings and flanges B C D, of the removable valve-seat E, the valve-cage I K L, the valve within the cage, the removable cap M, and screw O, substantially as set forth.

2. The combination, with the valve, of a cage surrounding such valve and a removable valve-seat, and a screw for holding the valve-cage to its place, substantially as set forth.

3. The combination, with the valve, of a removable valve-seat, a cage surrounding the valve, a valve-case with inlet and outlet openings, and an opening through which the valve-seat and cage can be removed or replaced, and a cover to such opening, substantially as set forth.

4. The combination, with the valve-case and valve, of a movable seat, a cage surrounding the valve, a screw-bolt, O, acting upon the cage to hold the same and the seat in place, and a stuffing-box around the plain portion of the screw-bolt, substantially as set forth.

Signed by me this 25th day of January, A. D. 1884.

C. L. BROADBENT.

Witnesses:
GEO. T. PINCKNEY,
WILLIAM G. MOTT.